Figure 1:
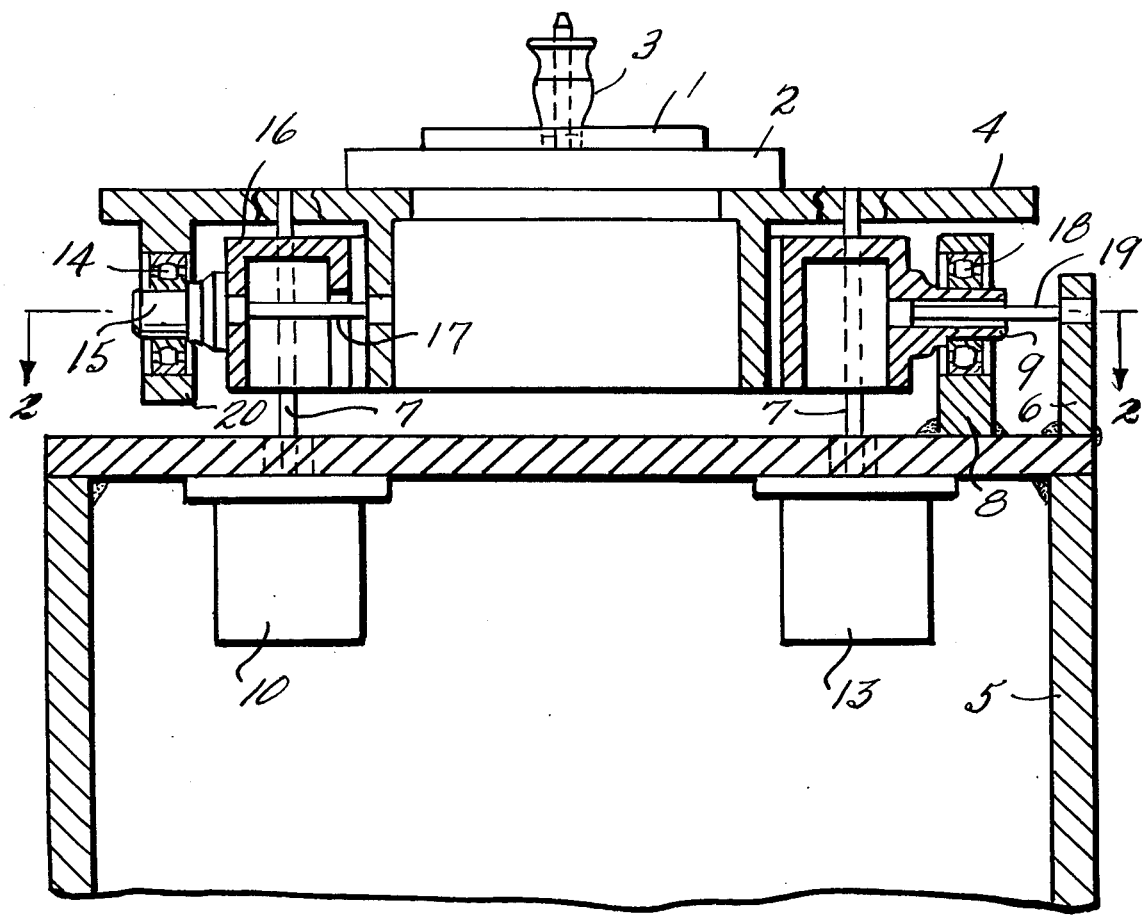

United States Patent [19]

Himmler

[11] 4,063,462
[45] Dec. 20, 1977

[54] APPARATUS FOR THE DETERMINATION OF THE STATIC UNBALANCE OF A TEST BODY

[75] Inventor: Günther Himmler, Darmstadt, Germany

[73] Assignee: Gebr. Hofmann KG, Darmstadt, Germany

[21] Appl. No.: 684,320

[22] Filed: May 7, 1976

[30] Foreign Application Priority Data

Jan. 20, 1975 Germany .............................. 2527592

[51] Int. Cl.² .............................................. G01M 1/04
[52] U.S. Cl. ................................................. 73/483
[58] Field of Search ................................. 73/483–486

[56] References Cited

U.S. PATENT DOCUMENTS

| | | | |
|---|---|---|---|
| 2,842,966 | 7/1968 | Rued | 73/483 |
| 3,096,655 | 7/1963 | Peterson | 73/483 |
| 3,587,296 | 6/1971 | Povoas | 73/65 |

*Primary Examiner*—Herbert Goldstein
*Attorney, Agent, or Firm*—Cushman, Darby & Cushman

[57] ABSTRACT

An apparatus for determining static imbalance of a test body with a receiving plate mounted gimbal-fashion in antifriction bearings with data receivers connected to the receiving plate whereby the receiving plate is supported radially, i.e., in a direction perpendicular to the plane of the gimbal axes, by antifriction bearings and axially, i.e., in the plane, by axially rigid torsion rods.

5 Claims, 2 Drawing Figures

APPARATUS FOR THE DETERMINATION OF THE STATIC UNBALANCE OF A TEST BODY

The invention relates to an apparatus for the determination of the static unbalance of a test body with a receiving plate which is mounted with gimbals in antifriction bearings in at least two degrees of freedom against the action of a counter force and with data receivers which are connected with the receiving plate.

In using such an apparatus, which is also called a balancing scale, it is necessary that the balancing body be located with its theoretical center of gravity above the cardan (gimbal) point of rotation. In order to achieve this, balancing scales with electromagnetic compensation have been known, for example German Pat. No. 1,648,510, in which the receiving plate is mounted movably in 2° of freedom and which is moved back always into the starting position by the compensating arrangement. Compensating arrangements have also been known for weighing mechanisms which are not suitable for the measurement of the static unbalance, for example German Pat. No. 1,194,167.

Even with these compensating arrangements, difficulties still occur with balancing scales having cardanic (gimbal) mounting. For the cardanic mounting of the receiving plates, grooved ball bearings or inclined ball bearings are used. These known ball bearings ensure both the radial as well as the axial fixation of the receiving plate as viewed in the direction of the gimbal axes.

The mounting in the radial direction in this case causes no problems; however axial mounting can be achieved only by a corresponding contact pressure force on the flanks of the ball bearings in an axial direction so as to prevent any play between the cardan (gimbal) bearing and the housing of the balancing scale.

One disadvantage of this mounting is that, as a result of the strong contact pressure forces arising from friction, a moment is produced about the pertinent gimbal axis. This frictional moment triggers a hysteresis, which considerably impairs the resolving power and the balancing precision of the balancing scale. Therefore, the danger exists that, despite an ideally balanced body, an erroneous unbalance will be indicated on the receiving plate because of bearing friction, especially in the direction of the gimbal axes. This indicated value corresponds to the frictional force of the mounting.

Whenever the contact pressure force of the flanks of the ball bearings is slight in the axial direction of the gimbal axes, then the receiving plate can be shifted as a result of pressure or of thrust, which in the case of grooved ball bearings can also produce a radial change of the carrying axle and can lead to incorrect measurements. This pressure or thurst can occur, for example in the case of the embedding of the balancing body, so that the cardan point of rotation moves out of its original position. The measuring electronic devices in this case will indicate an unbalance, although there is none.

Therefore, it is an object of the invention of an apparatus for the determination of the static unbalance of a test body, which has a good resolving power and guarantees a safe and practically friction-free mounting of the receiving plate.

This is solved according to this invention in that the receiving plate is mounted in a radial direction with regard to the gimbal axes by means of antifriction bearings and in an axial direction of the gimbal axes by axially rigid torsion rods. Preferably, the torsion rods coincide with the gimbal axes, so that in an axial direction of the torsional axes, a rigid and thus frictionless mounting of the receiving plate is guaranteed.

Thus, effectively two gimbal axes are provided, whereby the torsion rods lie in the cardan cross with two torsion rods attached with their ends to a gimbal ring and to the receiving plate, and two additional torsion rods displaced by 90° and attached with their ends at the gimbal ring and at the machine housing, or frame. Preferably the antifriction bearings are developed as self-aligned roller bearings. The torsion rods can also be made soft enough to bend.

The invention thus makes possible a gimbal mounting which, with respect to the gimbal axes, is practically friction-free both in axial as well as in a radial direction, since as a result of the rigid support in the direction of the gimbal axes, no contact pressure forces occur at the flanks of the ball bearings which produce fricional forces. No hysteresis results from this so that a higher precision of measurement and furthermore an improved alignment of the balancing scale becomes possible.

In the attached figures a preferred embodiment is shown. The invention is to be explained even in more detail on the basis of these figures.

Figure 2:
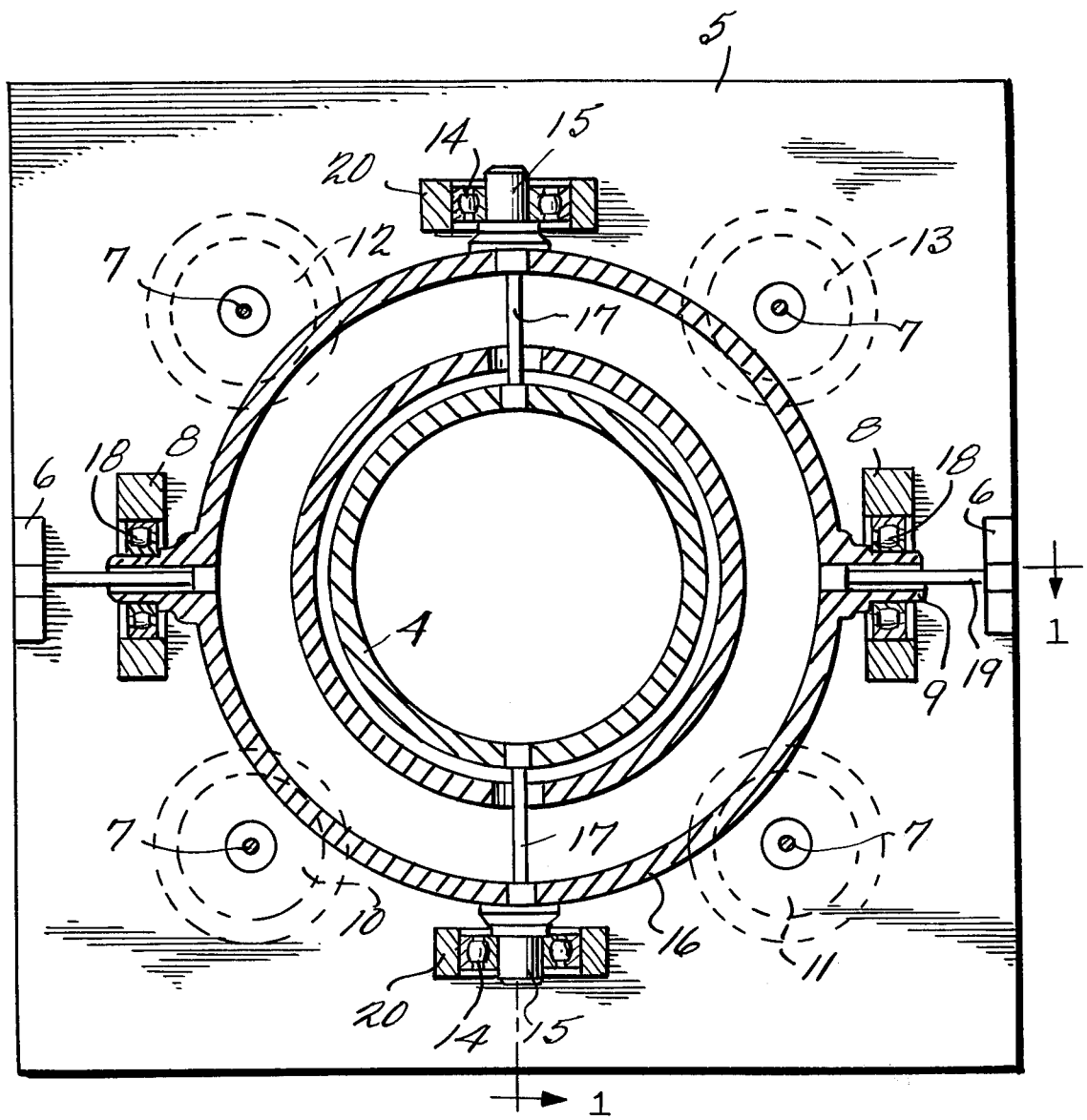

FIG. 1 shows a vertical section through a balancing scale along the lines 1—1 in FIG. 2; and FIG. 2 shows a top view through a horizontal cut of the balancing scale in FIG. 1 along the line 2—2.

The balancing scale shown in the figures has a receiving plate 2 on which a balancing body 1 that is to be measured can be precisely aligned with its theoretical center of gravity located centrally by means of a centering mandrel 3. The receiving plate 2 is located on a second larger receiving plate 4, on which it can be mounted by known means (not shown in detail). Each receiving plate 2 is adapted to receive a given body whose unbalance is to be measured.

The receiving plate 4 is mounted with gimbals on a machine housing 5, so that it can execute movements for example around two gimbal axes. Deflections of the receiving plate 4 from the horizontal, which are brought about by unbalance, can be detected by data receivers 10 and 11, which are conventional devices for the measurement of force. These data receivers 10 and 11 can be equipped moreover with a known compensating arrangements which, controlled by the deflection of the receiving plate 4, create a counterforce which returns the receiving plate 4 to its starting position.

Moreover, data receivers 12 and 13 are connected with the receiving plate 4, which balance out the static settlement of the receiving plate 4, which is brought about for example by the weight of the balancing body 1. The data receivers 10, 11, 12, 13 can be attached to the machine housing 5. Scanning means 7 of the data receivers are connected with the receiving plate 4.

To gimbal mount receiving plate 4, antifriction bearings 14 and 18 are provided. These antifriction bearings are disposed in a system of coordinates (intersection of axes) of the gimbal mounting. The receiving plate 4 is swivel mounted around one of the two gimbal axes by way of the antifriction bearings 14 on bearing bolts 15, which are attached to the gimbal ring 16. At the same time, antifriction bearings 14 are disposed in bridges 20 which are located on receiving plate 4. Gimbal ring 16 is mounted in antifriction bearings 18 which are displaced by 90° in relation to the antifriction bearings 14. Antifriction bearings 18 are housed in bridges 8 which are attached to the machine housing 5. The mounting of the gimbal ring 16 is accomplished by way of bearing bolts 9, which are attached on the gimbal ring 16. As a result of that mounting, gimbal ring 16 is swivel mounted on machine housing 5 around a second gimbal axis. This second gimbal axis is displaced by 90° with respect to the gimbal axis which runs antifriction bearing 14. In order to guarantee sufficient support vis-a-vis the machine housing, antifriction bearings 18 are housed in corresponding supports 8 on the housing. As a result, the receiving plate 4 is mounted radially in relation to the two gimbal axes. The antifriction bearings 14 and 18 for radial fixation of the gimbal ring 16 and of the receiving plate 4 are developed as self-aligned roller bearings.

The axial mounting is accomplished by axially rigid torsion rods 17 and 19. Torsion rods 17 are each attached at one end to the receiving plate 4 and at the other end to gimbal ring 16. The other two torsion rods 19 are displaced by 90° in relation to the torsion rods 17 and are each attached at one end to gimbal ring 16 and at the other on bridges locally fixed on the machine housing 5. The ends of the torsion rods 17 and 19 are attached with known means (not shown in detail) to the pertinent constructed units. In the illustrated embodiment, the torsional axes of the torsion rods 17 and 19 coincide with the gimbal axes. The torsion rods can also be made soft enough for bending. In order to increase the effective length of the torsion rods 19, they may extend through bearing bolts 9 and be attached in gimbal ring 16.

Beside the safe and frictionless axial fixation, the torsion rods 17 and 19 also have the added advantage that in the case of a deflection brought about by an unbalance, they urge return to their starting position and thus also compensate for slight, frictions in the antifriction bearings 14 and 18.

I claim:

1. In an apparatus for the determination of static imbalance of a test body having a receiving plate for said test body, a gimbal ring mounting said plate, means for mounting said plate for movement about two perpendicular gimbal axes in a plane and in at least two degrees of freedom, at least first and second data receivers coupled to said plate for detecting forces produced by imbalance and producing a counter force to maintain said plate in a predetermined position, the improvement wherein said ring mounting means includes a plurality of antifriction bearings along one of the gimbal axes for supporting said plate in a radial direction extending perpendicular to said plane and with respect to the gimbal axes and a plurality of axially rigid torsion bars which extend in said plane and along one of the gimbal axes to support said plate in an axial direction with respect to the gimbal axes.

2. In an apparatus as in claim 1, wherein the axes of the torsion rods coincide with the gimbal axes.

3. In an apparatus as in claim 2, the torsion rods lie in the cardan cross, whereby two torsion rods are attached with their ends to a gimbal ring and to the receiving plate and in that two additional torsion rods, displaced by 90°, are attached with their ends to the gimbal ring.

4. Apparatus as in claim 1, wherein the antifriction bearings are developed as self-aligned roller bearings.

5. Apparatus as in claim 1, wherein the torsion rods are soft enough for bending.

* * * * *